United States Patent [19]

Lin et al.

[11] Patent Number: 5,721,952
[45] Date of Patent: Feb. 24, 1998

[54] METHOD AND APPARATUS FOR AUTOMATIC DETECTION OF DISK TYPE IN A COMPUTER SYSTEM

[75] Inventors: Juin-Xian Lin, Taipei; De-Rong Chen, Tau-Yuan; Fang-Ping Chiang, Taipei, all of Taiwan

[73] Assignee: Acer Incorporated, Taipei, Taiwan

[21] Appl. No.: 563,760

[22] Filed: Nov. 29, 1995

Related U.S. Application Data

[63] Continuation-in-part of Ser. No. 390,852, Feb. 17, 1995, abandoned, and Provisional Application Ser. No. 60/000,096, Jul. 10, 1995.

[51] Int. Cl.⁶ .................................................. G06F 13/10
[52] U.S. Cl. ............................ 395/839; 395/835; 395/427
[58] Field of Search ...................................... 395/828–839

[56] References Cited

U.S. PATENT DOCUMENTS

| | | | |
|---|---|---|---|
| 4,928,192 | 5/1990 | Bartlett et al. | 360/77 |
| 5,111,444 | 5/1992 | Fukushima et al. | 369/58 |
| 5,136,711 | 8/1992 | Hugard et al. | 395/700 |
| 5,226,168 | 7/1993 | Kobayashi et al. | 395/800 |
| 5,237,689 | 8/1993 | Behnke | 395/700 |
| 5,307,497 | 4/1994 | Feigenbaum et al. | 395/700 |
| 5,327,549 | 7/1994 | Nissimov et al. | 395/425 |
| 5,367,682 | 11/1994 | Chang | 395/700 |
| 5,371,848 | 12/1994 | Casey et al. | 395/161 |
| 5,420,998 | 5/1995 | Horning | 395/425 |
| 5,430,845 | 7/1995 | Rimmer et al. | 395/275 |
| 5,461,719 | 10/1995 | Hosoya | 395/439 |
| 5,511,227 | 4/1996 | Jones | 395/829 |
| 5,590,376 | 12/1996 | Kou | 395/839 |
| 5,598,577 | 1/1997 | Overfield | 395/830 |
| 5,600,840 | 2/1997 | Pearce et al. | 395/750 |

*Primary Examiner*—Christopher B. Shin
*Attorney, Agent, or Firm*—Townsend and Townsend and Crew LLP

[57] ABSTRACT

Techniques for a computer system to automatically detect the type of hard disk drive installed in the system even if the hard disk drive has been replaced or upgraded. A method includes retrieving data from a partition table and calculating the necessary parameters from the values in the partition table. In a specific embodiment, the method includes calculating a HEAD parameter and a SECTORS/TRACK parameter from certain addresses stored in the partition table. The method further includes sending an IDENTIFY DRIVE (ID) command to the hard disk drive. Some types of hard disk drive communicate additional information in response to the ID command. The method includes calculating a CYLINDER parameter, using such additional information, if provided. Otherwise, the CYLINDER parameter is calculated from information in the partition table.

31 Claims, 4 Drawing Sheets

METHOD AND APPARATUS FOR AUTOMATIC DETECTION OF DISK TYPE IN A COMPUTER SYSTEM

CROSS-REFERENCE TO RELATED APPLICATIONS

This application is a continuation-in-part of U.S. application Ser. No. 08/390,852, filed Feb. 17, 1995 now abandoned, and U.S. Provisional Application Ser. No. 60/000,966, filed Jul. 10, 1995, the disclosures of which are hereby incorporated by reference for all purposes.

BACKGROUND OF THE INVENTION

The present invention relates generally to hard disk drives in computer systems and more particularly to methods and apparatus for automatically detecting the type of hard disk drive in a computer system.

Generally, a user of a conventional personal computer system who wants to use a new hard disk drive or replace or upgrade a hard disk drive has to set the type of hard disk drive. As an aid to users, the manufacturer often provides a program that stores the parameters or initial values of the hard disk drive in a non-volatile random access memory (NVRAM), sometimes also referred to as the CMOS setup memory. When the computer system is booted, the program automatically reads and loads the preset initial values from the NVRAM to initialize the hard disk drive. The user is thus spared having to set the hard disk drive type every time the computer system is booted.

This is clearly helpful, but when users change their settings of the hard disk drives or replace their hard disk drives, the users must again set the new hard disk drive parameters. The users have to determine for themselves the exact type and accurate parameters of their hard disk drives, and then setup and initialize the hard disk drive with the type and parameters of the hard disk drive. Otherwise, the hard disk drive will not work properly.

Some manufacturers claim that their computer systems automatically detect the type of the hard disk drive, and are able to initialize hard disk drives, including when the hard disk drive is replaced or upgraded. The technique used to achieve this goal is as follows. The CPU of the computer system sends out an Identify Drive (ID) command to the hard disk drive, in response to which the hard disk drive sends back information indicating the type of the hard disk drive. The CPU then initializes the hard disk drive according to the preset parameters corresponding to that type of hard disk drive. However, this technique only works for some new types of hard disk drives. For example, older hard disk drives such as ST406/412, OLD AT-BUS, some ST506, and some IDE drives are unable to send back such values in response to the ID signal.

Moreover, there are potential problems for even those drives that are able to send back values. This is because the hard disk drive may use parameters (including the CYLINDER parameter, HEAD parameter, and SECTORS/TRACK parameter) that are different than the preset values which are already known to the CPU, to set its partitions and format. In other words, the hard disk drive sends the CPU a signal representing its type in response to the ID command. The CPU then identifies the type of the hard disk drive according to that signal, chooses the set of preset parameters which are already known to the CPU for that type of the hard disk drive, and uses those parameters to initialize the hard disk drive. Unfortunately, these are the wrong parameters, and it is hard to predict what will happen.

SUMMARY OF THE INVENTION

The present invention provides techniques for a computer system to automatically detect the type of disk drive (hard disk and some bootable media) installed in the system. The techniques work even if the disk drive has been replaced or upgraded. Thus the users are assured of correct system operation without having to know the type of the new disk drive.

The present invention exploits the fact that the disk drive creates a partition table when it is formatted. In brief, a method according to the invention includes retrieving data from the partition table and calculating the necessary parameters from the values in the partition table. More specifically, the method includes directly calculating at least some of the parameters from values in the partition table, and, if identification data is available, making use of that data in the calculation.

In a specific embodiment, the method includes calculating a HEAD parameter and a SECTORS/TRACK parameter from certain addresses stored in the partition table. The method further includes sending an IDENTIFY DRIVE (ID) command to the hard disk drive. Some types of disk drive communicate additional information in response to the ID command. The method includes calculating a CYLINDER parameter, using such additional information, if provided. Otherwise, the CYLINDER parameter is calculated from information in the partition table.

The present invention may be implemented in software and stored in the computer system's BIOS firmware. The computer system can then execute the program during the booting process and automatically detect the type of disk drive.

A further understanding of the nature and advantages of the present invention may be realized by reference to the remaining portions of the specification and the drawings.

BRIEF DESCRIPTION OF THE DRAWINGS

FIG. 5 is a first example of a partition table in a conventional hard disk drive;

DESCRIPTION OF SPECIFIC EMBODIMENTS

System Overview

Figure 1:
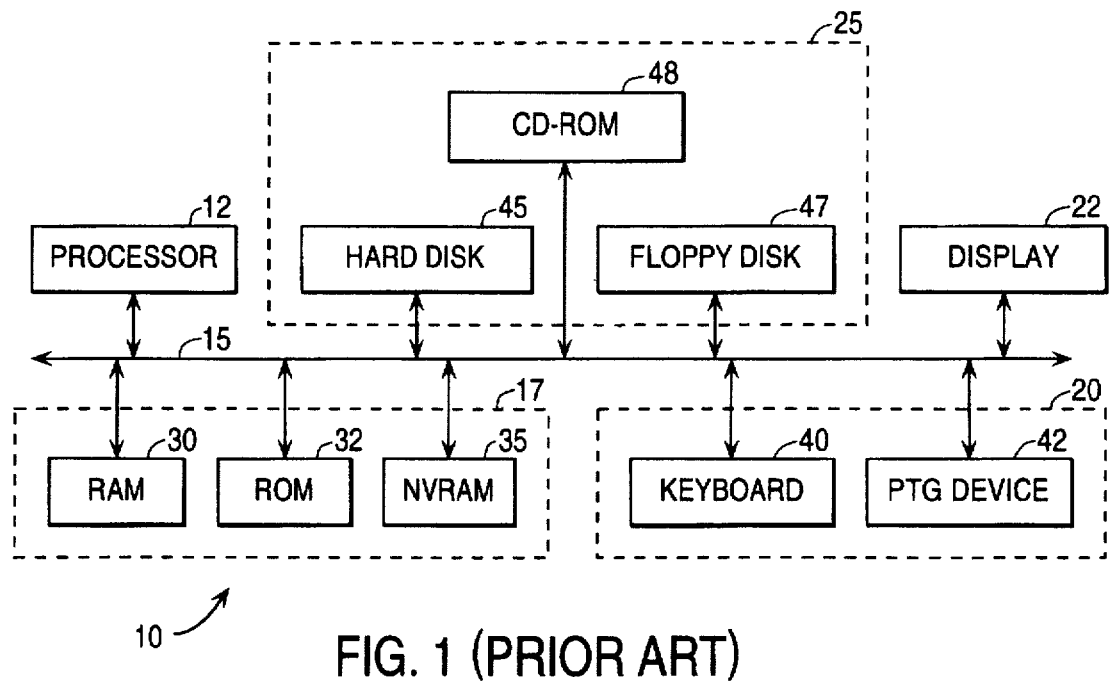
FIG. 1 is a system block diagram of a representative computer system incorporating the present invention.

FIG. 1 is a simplified block diagram of a computer system 10 embodying the present invention. The computer system configuration illustrated at this high level is standard, and as such, FIG. 1 is labeled prior art. A computer system such as system 10, suitably programmed to embody the present invention, however, is not. In accordance with known practice, the computer system includes a processor 12 that communicates with a number of peripheral devices via a bus subsystem 15. These peripheral devices typically include a memory subsystem 17, a user input facility 20, a display 22, and a file storage system 25. Bus subsystem 15 is shown schematically as a single bus, but a typical system has a number of buses such as a local bus and an expansion bus (e.g., ISA, EISA, MCA, or PCI). The computer system may be a desktop system or a portable system.

Memory subsystem 17 includes a number of memories including a main random access memory (RAM) 30, a read only memory (ROM) 32 in which the BIOS (basic input/ output system is stored), and a non-volatile RAM (NVRAM) 35 for storing system parameters. A program implementing the present invention is advantageously stored in ROM 32.

User input facility 20 typically includes a keyboard 40 and may further include a pointing device 42, such as a mouse or trackball. The file storage system stores program and data files, and typically includes at least one hard disk drive 45 and at least one floppy desk drive 47. There may also be other devices such as a CD-ROM drive 48 and optical drives. Additionally, the system may include hard drives of the type with removable media cartridges.

In this context, the term "bus system" is used generically so as to include any mechanism for letting the various components of the system communicate with each other as intended. With the exception of the input devices and the display, the other components need not be at the same physical location. Thus, for example, portions of the file storage system could be connected via various long-distance network media. Similarly, the input devices and display need not be at the same location as the processor, although it is anticipated that the present invention will most often be implemented in the context of PCs and workstations.

Figure 2:
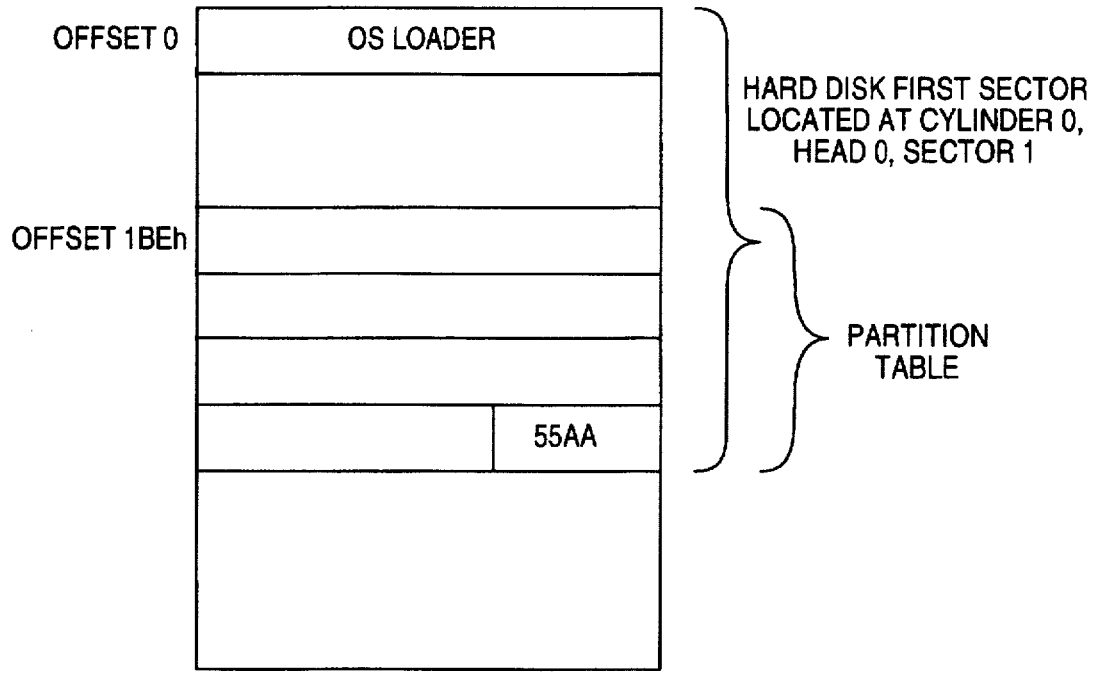
FIG. 2 is map of a hard disk drive, showing the location of the partition table.

FIG. 2 shows a partial map of hard disk drive 45. In particular, after the partitions of the hard disk drive have been set, a partition table is created and written in the first physical sector of the hard disk. The last two bytes of the partition table define a SIGNATURE field, which indicates whether the partition table and the data of the partition exist. A SIGNATURE value of 55AAh indicates that the partition of the hard disk drive has been set and that the partition table has been saved. In the present discussions, including the figures and tables, the suffix "h" or "(h)" denotes the hexadecimal representation of a number while the suffix "(d)" denotes the decimal representation of a number.

In addition to the SIGNATURE field, the partition table includes four 16-byte segments representing parameter data for up to four partitions. Where there are fewer than four partitions, the segments for partitions that have not been established are set to all 0's. Each 16-byte segment contains the range, size, and contents of the corresponding partition. The individual fields for each 16-byte segment are set forth in the following table:

| Byte Offset | Field Length | Field Meaning |
| --- | --- | --- |
| 00h | 1 byte | 00h = non-bootable; 80h = bootable |
| 01h | 1 byte | starting head |
| 02h | 1 byte | starting sector |
| 03h | 1 byte | starting cylinder |
| 04h | 1 byte | OS identifier |
| 05h | 1 byte | ending head |
| 06h | 1 byte | 6 bits for ending sector; 2 bits for 2 msb of ending cylinder |

-continued

| Byte Offset | Field Length | Field Meaning |
| --- | --- | --- |
| 07h | 1 byte | 8 lsb of ending cylinder |
| 08h | 1 double word | partition first sector |
| 0Ch | 1 double word | no. of sectors in partition |

The hard disk drive will compute the starting address, ending address, and the size of the partition according to the parameters that had been set during the formatting process of the hard disk drive. Then these data values will be written into the partition table.

Invention Operation Overview

Figure 3:
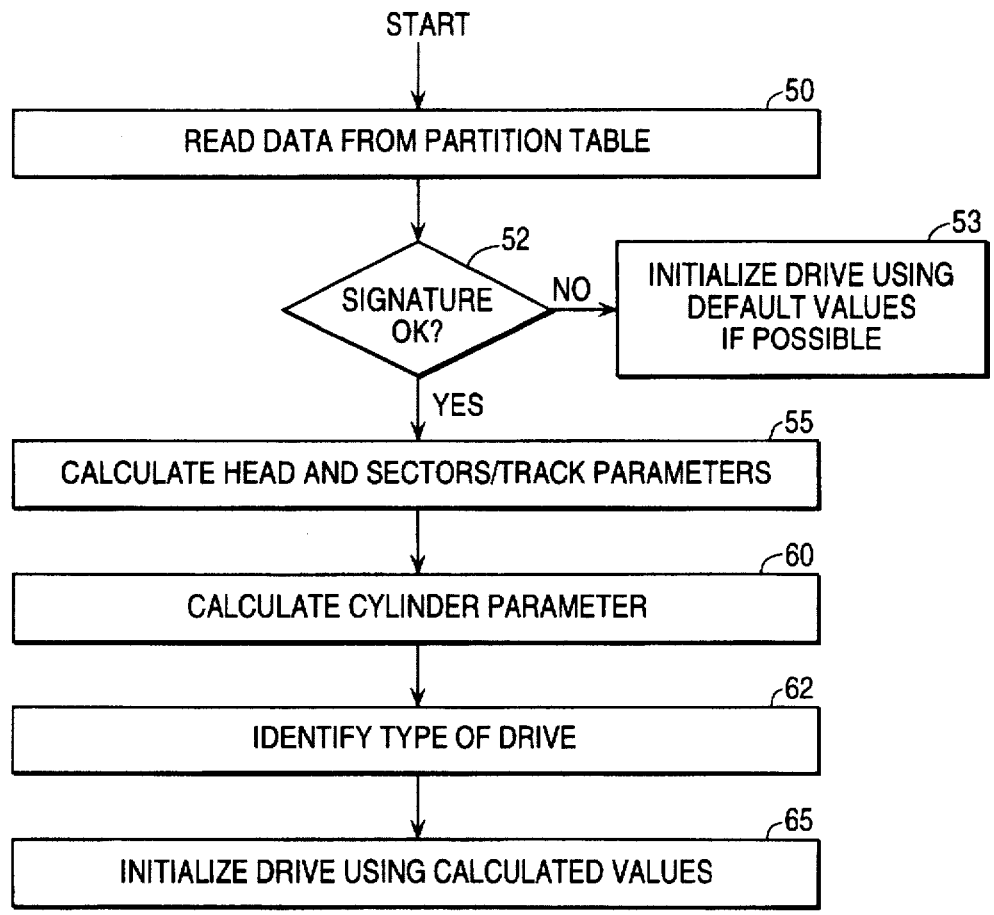
FIG. 3 is a flowchart of a method according to an embodiment of the present invention for automatically detecting the type of the hard disk drive in the computer system.

FIG. 3 is a flowchart of the automatic detection according to an embodiment of the present invention. The computer system may store the software utilizing the method mentioned above in BIOS ROM 32, so that the software could be executed and automatically detect the type of the hard disk drive in the booting process.

With this embodiment, and other embodiments to be described, it is preferred to provide the user the option of having the automatic detection program run every time the computer is booted. This can be provided by a menu selection. If the user elects to have the program run every time the computer is booted, the determined parameters will be used to initialize the hard disk drive. If the user elects not to have the program run automatically on boot, the program can be run once and the parameters stored in NVRAM 35 for use in initializing the hard disk drive on subsequent boots. Thus in the descriptions that follow, it should be understood that the program operation being described may have been invoked automatically on boot, or in response to a user command.

As alluded to above, the hard disk drive is characterized by a HEAD parameter (HP), a SECTORS/TRACK parameter (SP), and a CYLINDER parameter (CP). The system first reads data from the partition table (step 50), and checks the SIGNATURE field (step 52). If the value in this field is not 55AAh, the hard disk drive has not been formatted, and the system resorts to other techniques for initializing the hard disk drive (step 53), such as using default parameters previously provided by the hard disk drive.

If the value in the SIGNATURE field is 55AAh, the system proceeds to calculate the HEAD and SECTORS/ TRACK parameters from values in the partition table (step 55). As can be seen from the table above, the partition table includes address information, but does not directly provide the desired parameters. However, a logical block address can be expressed in terms of the HEAD and SECTORS/TRACK parameters and the head, sector, and cylinder addresses. A logical block address of 0 corresponds to the address of (cylinder 0, head 0, sector 1). The equation for computing a logical block address is as follows:

Logical Block Address=(((cylinder*HEAD parameter)+ head)*(SECTORS/TRACK parameter))+(sector−1)

or, in shorthand:

$LBA=(((CA*HP)+HA)*SP)+(SA-1)$ where:

> LBA = Logical Block Address
> CA = cylinder address
> HP = HEAD parameter
> HA = head address
> SP = SECTORS/TRACK parameter
> SA = sector address It is thus possible to express the starting and ending sector addresses in terms of the above equation and derive the following two equations:

Starting Address=(((starting cylinder*HEAD parameter)+starting head)*(SECTORS/TRACK parameter))+(starting sector–1)  (1)

Ending Address=(((ending cylinder*HEAD parameter)+ending head)*(SECTORS/TRACK parameter))+(ending sector–1)  (2)

It is also possible to calculate the starting and ending sector addresses directly from the partition table information as follows:

Starting Address = partition first sector  (3)

Ending Address = (partition first sector) + (sectors in partition) – 1  (4)

Substituting equations (3) and (4) into equations (1) and (2) leads to two equations in two unknowns, namely the HEAD and SECTORS/TRACK parameters, since the values of all the other coefficients are stored in the partition table. Solving these equations provides values for these two parameters.

The system then proceeds to determine the CYLINDER parameter (step 60). After the CYLINDER, HEAD, and SECTORS/TRACK parameters have been determined, the type of hard disk drive is identified accurately (step 62). The system then initializes the hard disk drive using the calculated values of the CYLINDER, HEAD, and SECTORS/TRACK parameters (step 65). While the hard disk drive could still be initialized without the accurate parameters, it would be impossible to use the hard disk drive's full space.

Figures 4, 6:
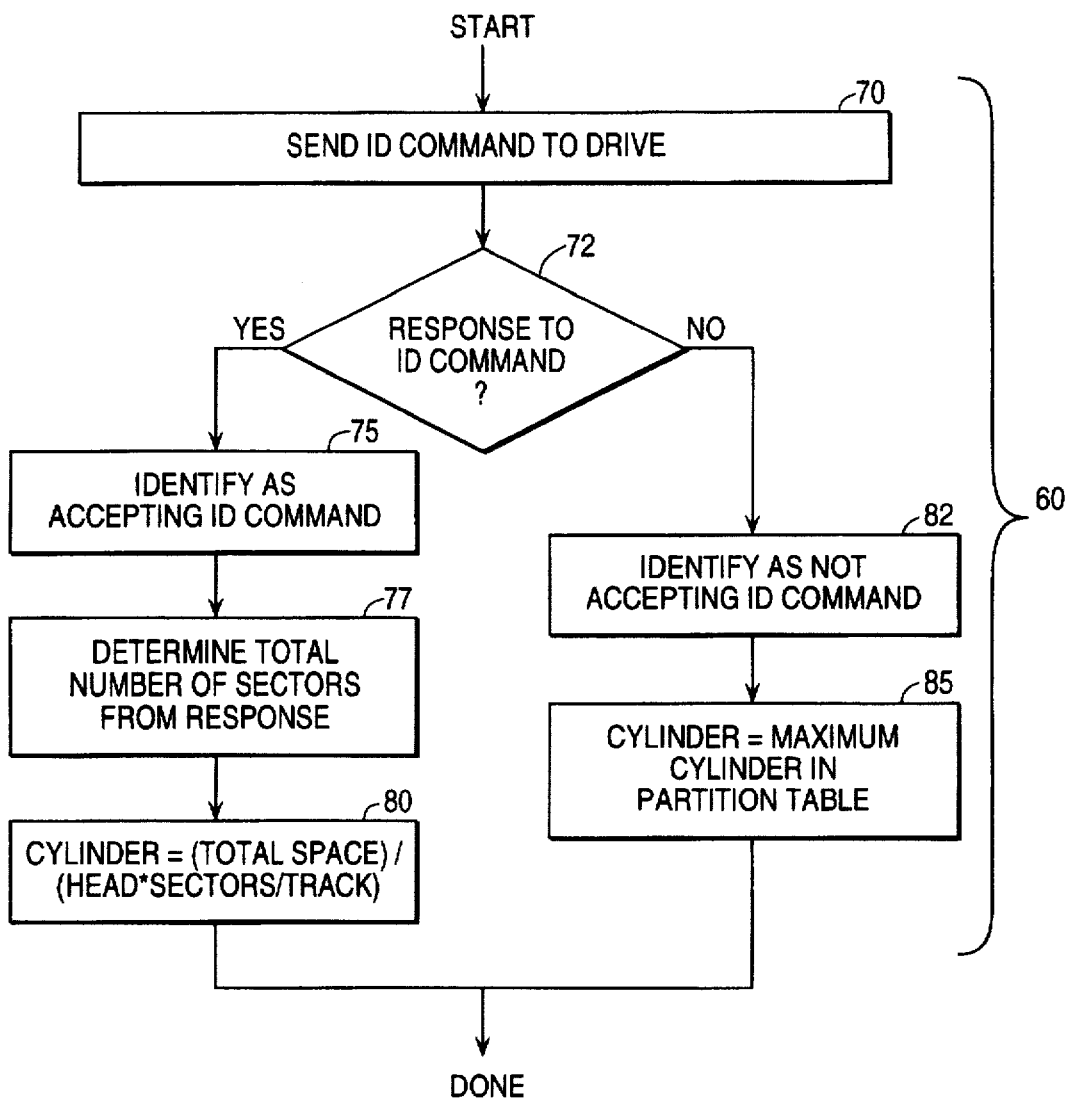
FIG. 4 is a flowchart of the method for detecting the CYLINDER parameter of the hard disk drive in the computer system.
FIG. 6 is a second example of a partition table in a conventional hard disk drive.

FIG. 4 is a flowchart illustrating the manner in which the CYLINDER parameter is determined (step 60 above). In short, the CYLINDER parameter is determined in one of two ways, depending on whether the hard disk drive is of a type that responds to ID commands. The system sends the ID command to the hard disk drive (step 70), and determines whether the ID command is accepted and executed, i.e., whether there is a response (step 72).

The response to the ID command is a 256-word block of data identifying the drive. This data includes such information as the model number, serial number, total space (i.e., the total number of sectors) on the drive, and default values of the CYLINDER, HEAD, and SECTORS/TRACK parameters. If the user has reformatted the drive, the returned values of the CYLINDER, HEAD, and SECTORS/TRACK parameters will not reflect the actual state of the hard disk drive. The total space, however, does not change with reformatting, and represents valid and useful data.

If the ID command is accepted and executed, the hard disk drive is identified as one that accepts such commands (step 75). In such a case, the total space (i.e., the total number of sectors) of the hard disk drive is determined from data in the response to the ID command (step 77). The CYLINDER parameter is then calculated by dividing the total number of sectors by the HEAD parameter and the SECTORS/TRACK parameter (step 80).

If the ID command is not accepted and is not executed, the system identifies the hard disk drive as a non-AT-BUS type (step 82). The CYLINDER parameter is then taken as the maximum value of the ending cylinder in the partition table (step 85).

FIRST EXAMPLE

As a first example, consider a hard disk drive having the partition table of FIG. 5. In this example, the hard disk drive has an IDE (Integrated Drive Electronics) interface, which accepts ID commands.

As can be seen from the contents of the partition table, the starting address of the first partition is 125D:05BE, and the ending address of the first partition is 125D:05CD. However, the contents of the second, third, and fourth partition segments are all 0's, indicating that the hard disk drive utilized only the first partition when it was formatted. The contents of the partition table segment are as follows:

| Parameters | First Partition |
| --- | --- |
| bootable | 80(h) |
| starting head | 01 |
| starting sector | 01 |
| starting cylinder | 0 |
| OS identifier | 06(h) |
| ending head | 0C(h) = 12(d) |
| ending sector | B3 bits(5:0) = 33(h) = 51(d) |
| ending cylinder | B3 bits(7:6) + D1(h) = 2D1(h) = 721(d) |
| partition first sector | 00000033(h) = 51(d) |
| sectors in partition | 00074DAB(h) = 478635(d) |

The starting address of the sole partition is (cylinder 0, head 1, sector 1), and the ending address is (cylinder 721, head 12, sector 51). Therefore:

Starting Address = partition first sector = 51
Ending address  = partition first sector +
                   sectors in the partition – 1
                = 51 + 478635 – 1
                = 478685

Substituting these two values into the address transform equation proceeds as follows:

Since Address = (((cylinder * HP) + head) * SP) + sector – 1),
51       = (0 * HP + 1) * SP + (1 – 1)
478685   = (721 * HP + 12) * SP + (51 – 1)

Solving the two equations leads to HP=13 and SP=51.

Since the hard disk drive has an IDE interface, it accepts ID commands. One of the parameters returned is the total space of the hard disk drive, which is known to be 479349 sectors.

Since Total Sectors=CP*HP*SP
CP=Total Sectors/(HP*SP)=479349/(13*51)=723
Thus, the parameters of the hard disk drive are:
  CYLINDER parameter=723,
  HEAD parameter=13, and
  SECTORS/TRACK parameter=51.
From these parameters, the type of the hard disk drive becomes known, and the drive can be initialized accurately.

SECOND EXAMPLE

As a second example, consider a hard disk drive having the partition table of FIG. 6. In this example, the hard disk drive is an ST506 type, which does not accept ID commands. As can be seen from the contents of the partition table the starting address of the first partition is 145B:05BE, the ending address of the first partition is 145B:05CD, the starting address of the second partition is 145B:05CE, and the ending address of the second partition is 145B:05DD. The contents of the third and fourth segments are all 0's, indicating that the hard disk drive utilized only two partitions when formatted.

The contents of the partition table segments for the two partitions are as follows:

| Parameters | First Partition | Second Partition |
|---|---|---|
| bootable | 80(h) | 0 |
| starting head | 01 | 01 |
| starting sector | 01 | C1 |
| starting cylinder | 0 | 03 |
| OS identifier | 04 | 05 |
| ending head | 04 | 04 |
| ending sector | D1(h) bits(0:5) = 11(h) = 17(d) | 17(d) |
| ending cylinder | D1(h) bits(6:7) 7 + D2(h) = 302(h) = 770(d) | 3FD(h) = 1021(d) |
| partition first sector | 00000011(h) = 17(d) | 0000FFFF(h) |
| sectors in partition | 0000FFEE(h) = 65518(d) | 00005357(h) |

As shown in the above table, the starting address of the first partition is (cylinder 0, Head 1, Sector 1) and the ending address of the first partition is (cylinder 770, head 4, sector 17). Therefore:

$$\text{Starting address} = \text{partition first sector} = 17$$
$$\begin{aligned}\text{Ending address} &= \text{partition first sector} + \text{sectors in partition} - 1 \\ &= 17 + 65518 - 1 \\ &= 65534\end{aligned}$$

These two equations are solved by substituting the two values into the address transform equation:

$$17 = (0 * HP + 1) * SP + (1 - 1)$$
$$65534 = (770 * HP + 4) * SP + (17 - 1)$$

Solving these equations leads to HP=5 and SP=17.

However, since this hard disk drive is an ST506 type, it does not accept ID commands, and so is unable to communicate the total space of the hard disk drive. Because the total space of the hard disk drive is not known, it is not possible to solve for the CYLINDER parameter from the total space of the hard disk drive as was done in the first example. However, it is possible to use the largest ending cylinder in the partition table as the CYLINDER parameter of the hard disk drive.

In this example, the ending cylinder of the first partition is 770, and the ending cylinder of the second partition is 1021. Therefore, MAX(1021, 770)=1021, and this hard disk drive is identified as having:
CYLINDER parameter=1021,
HEAD parameter=5, and
SECTORS/TRACK parameter=17.

Alternative Embodiment

Figure 7:
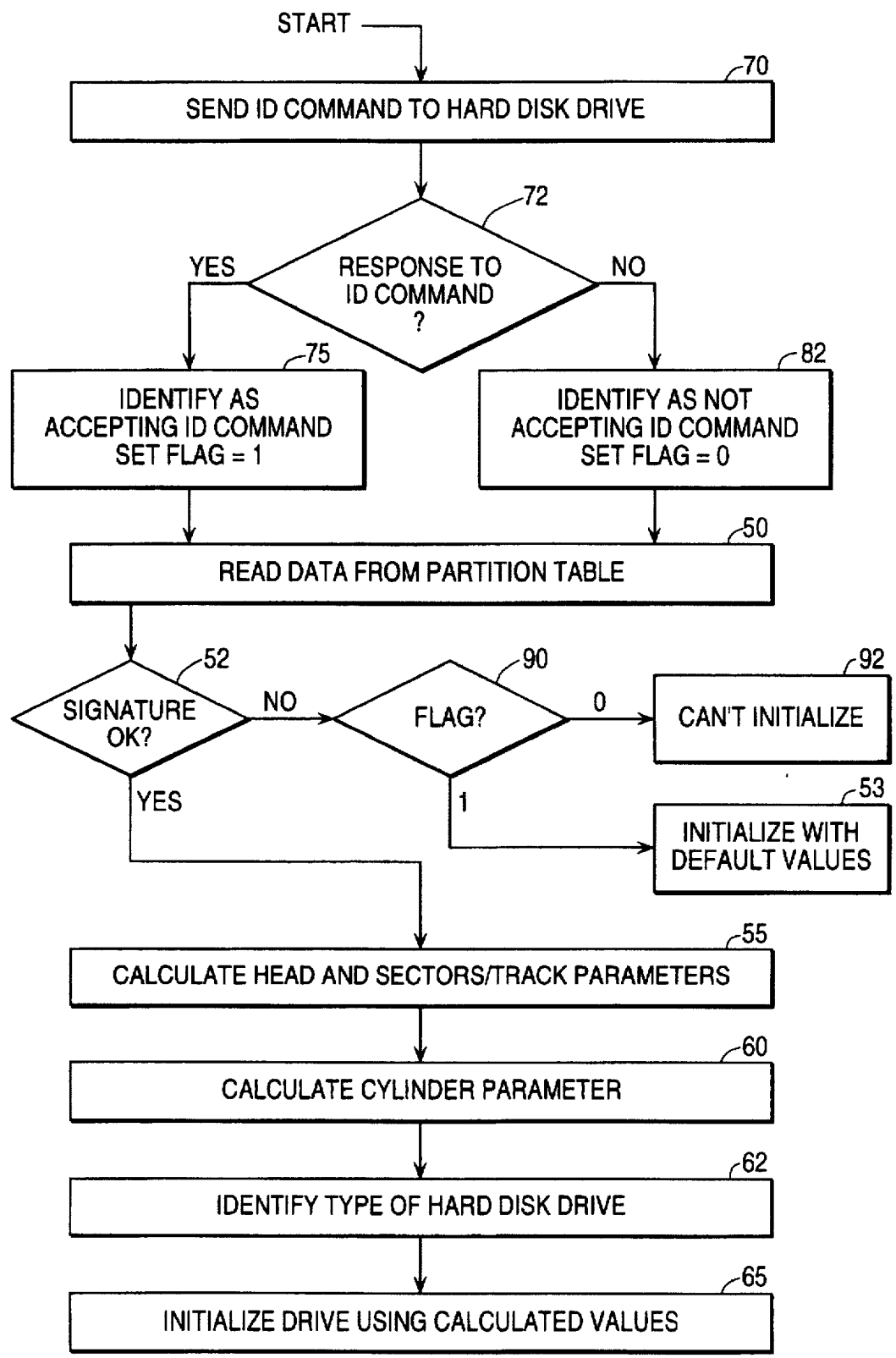
FIG. 7 is a flowchart of a method according to another embodiment of the invention.

FIG. 7 is a flowchart of a method according to another embodiment of the invention. Many of the steps correspond to steps described above, and corresponding reference numerals are used. In this embodiment, the system first sends the ID command to the hard disk drive (step 70), and determines whether the ID command is accepted and executed, i.e., whether there is a response (step 72). If the ID command is accepted and executed, the hard disk drive is identified as one that accepts such commands, and a flag is set to 1 (step 75). If the ID command is not accepted and is not executed, the system identifies the hard disk drive as a non-AT-BUS type (step 82) and the flag is set to 0. For definiteness, the values 1 and 0 are used, but any pair of distinguishing values can be used. In fact, the flag could be a location (such as the location for the total number of sectors) that is initially set to 0 and has a non-zero data value stored if and when the hard disk drive responds to the ID command.

The system reads data from the partition table (step 50), and checks the SIGNATURE field (step 52). As above, if the value in this field is not 55AAh, the system will not be able to use partition table data to determine the values of the CYLINDER, HEAD, and SECTORS/TRACK parameters. The system then checks the flag (step 90), and if the flag is 1, the system initializes the hard disk drive using default parameters previously provided in response to the ID command (step 53). If the flag is not 1, the system is unable to initialize the hard disk drive (step 92), and optionally informs the user of that fact. If there are parameter values stored in NVRAM 35, these can in principle be used, but the results could be other than as expected.

If the value in the SIGNATURE field is 55AAh, the system proceeds to calculate the HEAD and SECTORS/TRACK parameters from values in the partition table (step 55) and then proceeds to determine the CYLINDER parameter (step 60). After the CYLINDER, HEAD, and SECTORS/TRACK parameters have been determined, the type of hard disk drive is identified accurately (step 62). The system then initializes the hard disk drive using the calculated values of the CYLINDER, HEAD, and SECTORS/TRACK parameters (step 65). Calculation of the CYLINDER parameter proceeds as shown in FIG. 4, with the branch depending on the value of the flag.

Conclusion

In conclusion, it can be seen that the present invention allows the relevant parameters of a hard disk drive to be determined automatically, even if the drive has been reformatted.

While the above is a complete description of specific embodiments of the invention, various modifications, alternative constructions, and equivalents may be used.

For example, while the above description was in terms of hard disk drives, the invention could be utilized on at least one type of CD-ROM. Of the many standards for CD-ROM, one is the "BOOTABLE CD-ROM FORMAT SPECIFICATION" established by the ATAPI association. ATAPI is the abbreviation of "AT Attachment Packet Interface", which refers to the interface and protocol used to access a hard disk and CD-ROM drive on AT compatible computers. CD-ROM titles which obey this standard store data in a format similar to the hard disks in spite of the data capacity for each sector. Accordingly, it is possible to use such CD-ROM titles as "replaceable hard disks", which means such replaceable CD titles stores data in the same way as a hard disk. Since, different CD-ROM titles may use different parameter values, it is necessary to know the HEAD, SECTORS/TRACK, and CYLINDER parameters in order to access the data on the CD-ROM titles. The present invention makes this possible by finding the first sector, reading the partition table, and calculating the parameters as described above.

Therefore, the above description should not be taken as limiting the scope of the invention as defined by the claims.

What is claimed is:

1. A method for automatically detecting the type of disk drive in a computer system, the method comprising operating the system to perform the steps of:

(a) reading partition table data from a partition table of the disk drive;

(b) calculating a HEAD parameter and a SECTORS/TRACK parameter of the disk drive on the basis of the partition table data; and (c) calculating a CYLINDER parameter of the disk drive at least partly on the basis of the partition table data;

the calculated HEAD, SECTORS/TRACK, and CYLINDER parameters thereby providing information for automatically detecting the type of disk drive.

2. The method of claim 1 wherein step (b) is conditioned on determining that a particular SIGNATURE data portion of the partition table data meets a predetermined condition.

3. The method of claim 1 wherein the partition table data includes:

SIGNATURE data verifying the partition table;

a starting sector address and an ending sector address of at least one partition;

a starting head address and an ending head address of at least one partition;

a starting cylinder address and an ending cylinder address of at least one partition;

the starting address of at least one partition; and the total sectors of at least one partition.

4. A method for automatically detecting the type of disk drive in a computer system, the method comprising the steps of:

(a) reading partition table data from a partition table of the disk drive; and (b) calculating a HEAD parameter and a SECTORS/TRACK parameter of the disk drive on the basis of the partition table data; and (c) calculating a CYLINDER parameter of the disk drive;

the calculated HEAD, SECTORS/TRACK, and CYLINDER parameters thereby identifying the type of disk drive.

5. The method of claim 4 wherein the CYLINDER parameter is calculated by the steps of:

determining the total number of sectors of the disk drive; and dividing the total space of the disk drive by the HEAD parameter and by the SECTORS/TRACK parameter.

6. The method of claim 4 wherein:

the partition table data includes an ending cylinder address for each partition on the disk drive; and the CYLINDER parameter is calculated by choosing the largest ending cylinder address from the partition table data.

7. The method of claim 4 wherein the CYLINDER parameter is determined by the steps of:

(c) sending an ID (Identify Drive) command to the disk drive; and (d1) if a response to the ID command is received, calculating the CYLINDER parameter of the disk drive using information sent by the disk drive in response to the ID command;

(d2) otherwise, if no response to the ID command is received, determining the CYLINDER parameter using the partition table data alone.

8. The method of claim 4 wherein the partition table data includes:

SIGNATURE data verifying the partition table;

a starting sector address and an ending sector address of at least one partition;

a starting head address and an ending head address of at least one partition;

a starting cylinder address and an ending cylinder address of at least one partition;

the starting address of at least one partition; and the total sectors of at least one partition.

9. The method of claim 4 wherein the HEAD and SECTORS/TRACK parameters are calculated by correlating expressions for starting and ending logical block addresses with explicit sector address information.

10. A method for automatically detecting the type of disk drive in a computer system, the method comprising the steps of:

(a) reading partition table data from a partition table of the disk drive, the partition table data including, for each partition of the disk drive, a sector starting address, a sector ending address, a head starting address, a head ending address, a total number of sectors, a cylinder starting address, and a cylinder ending address;

(b) calculating a HEAD parameter and a SECTORS/TRACK parameter of the disk drive on the basis of the partition table data;

(c) sending an ID (Identify Drive) command to the disk drive; and (d1) if a response to the ID command is received, calculating a CYLINDER parameter of the disk drive on the basis of information sent by the disk drive in response to the ID command;

(d2) otherwise, if no response to the ID command is received, determining the CYLINDER parameter on the basis of the partition data;

the HEAD, SECTORS/TRACK, and CYLINDER parameters thereby providing information for automatically defecting the type of disk drive.

11. The method of claim 10 wherein step (c) is performed before step (a).

12. The method of claim 10 wherein step (c) is performed after step (a).

13. The method of claim 10 wherein conditional step (d1) comprises the substeps of:

determining the total space of the disk drive on the basis of the information sent by the disk drive in response to the ID command; and calculating the CYLINDER parameter by dividing the total space of the disk drive by the HEAD parameter and the SECTORS/TRACK parameter.

14. The method of claim 10 wherein conditional step (d2) comprises determining the largest ending cylinder address for partitions in the partition table.

15. The method of claim 10, and further comprising the step, performed before step (b), of determining whether a particular SIGNATURE data portion of the partition table data meets a predetermined condition.

16. The method of claim 15 wherein the predetermined condition is that the signature data have a particular defined value.

17. The method of claim 10, and further comprising the steps of:

initializing the disk drive using the calculated HEAD, SECTORS/TRACK, and CYLINDER parameters; and storing the calculated HEAD, SECTORS/TRACK, and CYLINDER parameters in a non-volatile memory for subsequent use.

18. A method for automatically detecting the type of disk drive in a computer system, the method comprising operating the system to perform the steps of:
   (a) reading partition table data from a partition table of the disk drive;
   (b) determining whether a particular SIGNATURE data portion of the partition table data meets a predetermined condition; and
   (c) if so, calculating a HEAD parameter and a SECTORS/TRACK parameter of the disk drive on the basis of the partition table data, and calculating a CYLINDER parameter of the disk drive at least partly on the basis of the partition table data;
   said calculated HEAD parameter, SECTORS/TRACK parameter, and CYLINDER parameter thereby identifying the type of disk drive.

19. A method for automatically detecting the type of disk drive in a computer system, the method comprising the steps of:
   (a) sending an ID (Identify Drive) command to the disk drive;
   (b) reading partition table data from a partition table of the disk drive, the partition table data including a SIGNATURE data portion;
   (c) determining whether the SIGNATURE data portion of the partition table data meets a predetermined condition;
   (d1) if the SIGNATURE data meets the predetermined condition and the disk drive responded to the ID command,
      calculating a HEAD parameter and a SECTORS/TRACK parameter of the disk drive on the basis of the partition table data,
      calculating a CYLINDER parameter of the disk drive on using information sent by the disk drive in response to the ID command and partition table data, and
      initializing the disk drive using the calculated HEAD, SECTORS/TRACK, and CYLINDER parameters;
   (d2) if the SIGNATURE data meets the predetermined condition and the disk drive did not respond to the ID command,
      calculating the HEAD parameter, the SECTORS/TRACK parameter, and the CYLINDER parameter of the disk drive solely on the basis of the partition table data, and
      initializing the disk drive using the calculated HEAD, SECTORS/TRACK, and CYLINDER parameters; and
   (d3) if the SIGNATURE data does not meet the predetermined condition and the disk drive responded to the ID command, initializing the disk drive using information sent by the disk drive in response to the ID command.

20. The method of claim 19 wherein the partition table data includes:
   SIGNATURE data verifying the partition table;
   a starting sector address and an ending sector address of at least one partition;
   a starting head address and an ending head address of at least one partition;
   a starting cylinder address and an ending cylinder address of at least one partition;
   the starting address of at least one partition; and
   the total sectors of at least one partition.

21. The method of claim 19 wherein step (b) is performed before step (a).

22. The method of claim 19 wherein step (b) is performed after step (a).

23. The method of claim 19 wherein the step of calculating the CYLINDER parameter in conditional step (d1) comprises:
   determining the total space of the disk drive on the basis of the information sent by the disk drive in response to the ID command; and
   calculating the CYLINDER parameter by dividing the total space of the disk drive by the HEAD parameter and the SECTORS/TRACK parameter.

24. The method of claim 19 wherein the step of calculating the CYLINDER parameter in conditional step (d2) comprises determining the largest ending cylinder address for partitions in the partition table.

25. The method of claim 19 wherein the predetermined condition is that the signature data have a particular defined value.

26. A computer system comprising:
   a processor;
   a disk drive;
   a memory storing a program which, when executed by the processor, causes the computer system to perform the steps of:
      (a) reading partition table data from a partition table of the disk drive; and
      (b) calculating a HEAD parameter and a SECTORS/TRACK parameter of the disk drive on the basis of the partition table data; and
      (c) calculating a CYLINDER parameter of the disk drive;
   the calculated HEAD, SECTORS/TRACK, and CYLINDER parameters thereby identifying the type of disk drive.

27. The computer system of claim 26 wherein the CYLINDER parameter is calculated by the steps of:
   determining the total number of sectors of the disk drive; and
   dividing the total space of the disk drive by the HEAD parameter and by the SECTORS/TRACK parameter.

28. The computer system of claim 26 wherein:
   the partition table data includes an ending cylinder address for each partition on the disk drive; and
   the CYLINDER parameter is calculated by choosing the largest ending cylinder address from the partition table data.

29. The computer system of claim 26 wherein the CYLINDER parameter is determined by the steps of:
   (c) sending an ID (Identify Drive) command to the disk drive; and
   (d1) if a response to the ID command is received, calculating the CYLINDER parameter of the disk drive using information sent by the disk drive in response to the ID command;
   (d2) otherwise, if no response to the ID command is received, determining the CYLINDER parameter using the partition table data alone.

30. The computer system of claim 26 wherein the partition table data includes:
   SIGNATURE data verifying the partition table;

a starting sector address and an ending sector address of at least one partition;

a starting head address and an ending head address of at least one partition;

a starting cylinder address and an ending cylinder address of at least one partition;

the starting address of at least one partition; and the total sectors of at least one partition.

31. The computer system of claim 26 wherein the HEAD and SECTORS/TRACK parameters are calculated by correlating expressions for starting and ending logical block addresses with explicit sector address information.

* * * * *